(12) United States Patent
Miller

(10) Patent No.: US 12,715,500 B2
(45) Date of Patent: Aug. 25, 2026

(54) CONTROL DEVICE FOR A VEHICLE HAVING A STEERING DEVICE, STEERING DEVICE AND METHOD FOR HEATING A WORKING MEDIUM IN A PREHEATING PHASE FOR A STEERING DEVICE

(71) Applicant: KNORR-BREMSE Systeme fuer Nutzfahrzeuge GmbH, Munich (DE)

(72) Inventor: Bernhard Miller, Weil der Stadt (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 461 days.

(21) Appl. No.: 18/277,754

(22) PCT Filed: Jan. 26, 2022

(86) PCT No.: PCT/EP2022/051792

§ 371 (c)(1),
(2) Date: Aug. 17, 2023

(87) PCT Pub. No.: WO2022/175042

PCT Pub. Date: Aug. 25, 2022

(65) Prior Publication Data

US 2024/0300573 A1 Sep. 12, 2024

(30) Foreign Application Priority Data

Feb. 18, 2021 (DE) ..................... 10 2021 103 813.8

(51) Int. Cl.

| | |
|---|---|
| ***B62D 5/06*** | (2006.01) |
| ***B62D 5/04*** | (2006.01) |
| ***B62D 5/065*** | (2006.01) |

(52) U.S. Cl.
CPC ............. *B62D 5/064* (2013.01); *B62D 5/046* (2013.01); *B62D 5/065* (2013.01)

(58) Field of Classification Search
CPC ........ B62D 5/064; B62D 5/046; B62D 5/065; B62D 5/0496; B62D 5/06; B62D 5/12; B62D 5/24
See application file for complete search history.

(56) References Cited

U.S. PATENT DOCUMENTS

| | | | |
|---|---|---|---|
| 5,360,322 | A | 11/1994 | Henein et al. |
| 5,786,674 | A | 7/1998 | Kress et al. |

(Continued)

FOREIGN PATENT DOCUMENTS

| | | | |
|---|---|---|---|
| DE | 196 23 567 | A1 | 12/1997 |
| DE | 10 2005 016 555 | A1 | 3/2006 |

(Continued)

OTHER PUBLICATIONS

International Search Report (PCT/ISA/210) issued in PCT Application No. PCT/EP2022/051792 dated Apr. 22, 2022 with English translation (4 pages).

(Continued)

*Primary Examiner* — Drew J Brown
(74) *Attorney, Agent, or Firm* — Crowell & Moring LLP

(57) ABSTRACT

A control unit is provided for a vehicle with a steering device having a pump device, which has a pump and an electric motor, a transmission, and a valve. The control unit is designed to provide, in a preheating phase for heating the working medium, a motor signal to the electric motor for operating the electric motor of the steering device, and to provide a valve opening signal to the valve for opening the valve of the steering device.

4 Claims, 3 Drawing Sheets

(56) References Cited

U.S. PATENT DOCUMENTS

| | | | |
|---|---|---|---|
| 6,257,364 B1 | 7/2001 | Parkhill et al. | |
| 2005/0175479 A1 | 8/2005 | Gandrud et al. | |
| 2006/0075751 A1 * | 4/2006 | Bender | B62D 5/064 60/456 |
| 2006/0237256 A1 | 10/2006 | Sasaki et al. | |
| 2009/0266640 A1 * | 10/2009 | Oshima | B62D 5/0403 180/444 |
| 2011/0190986 A1 * | 8/2011 | Bitou | B62D 5/064 701/41 |
| 2021/0017997 A1 | 1/2021 | Tiller et al. | |
| 2022/0153341 A1 | 5/2022 | Lang et al. | |

FOREIGN PATENT DOCUMENTS

| | | | |
|---|---|---|---|
| DE | 10 2006 017 040 A1 | 10/2006 | |
| DE | 10 2007 053 263 A1 | 5/2009 | |
| DE | 202019101522 U1 * | 4/2019 | B62D 5/064 |
| DE | 10 2018 105 136 A1 | 9/2019 | |
| DE | 102021103818 A1 * | 8/2022 | F04B 17/03 |
| EP | 0 819 852 A2 | 1/1998 | |
| EP | 1 118 527 A1 | 7/2001 | |
| EP | 2353969 A2 * | 8/2011 | H02K 5/203 |
| EP | 3 035 506 A1 | 6/2016 | |
| JP | 62-216868 A | 9/1987 | |
| JP | 2000-247247 A | 9/2000 | |
| JP | 2008-273361 A | 11/2008 | |
| JP | 2010-200460 A | 9/2010 | |
| JP | 2011-83056 A | 4/2011 | |
| JP | 2011-178381 A | 9/2011 | |
| WO | WO-2007055296 A1 * | 5/2007 | B62D 5/04 |

OTHER PUBLICATIONS

German-language Written Opinion (PCT/ISA/237) issued in PCT Application No. PCT/EP2022/051792 dated Apr. 22, 2022 with English translation (12 pages).

German-language Office Action issued in German Application No. 10 2021 103 813.8 dated Nov. 26, 2021 (14 pages).

International Preliminary Report on Patentability (PCT/IB/338 & PCT/IB/373) issued in PCT Application No. PCT/EP2022/051792 dated Aug. 31, 2023, including English translation of document C2 (Japanese-language Written Opinion (PCT/ISA/237) filed on Aug. 17, 2023) (10 pages).

Japanese-language Office Action issued in Japanese Application No. 2023-549839 dated Jun. 18, 2024 with English translation (16 pages).

* cited by examiner

CONTROL DEVICE FOR A VEHICLE HAVING A STEERING DEVICE, STEERING DEVICE AND METHOD FOR HEATING A WORKING MEDIUM IN A PREHEATING PHASE FOR A STEERING DEVICE

BACKGROUND AND SUMMARY

The present disclosure relates to a control unit for a vehicle with a steering device, a steering device, as well as a method for heating a working medium in a preheating phase for a steering device.

For example, in the case of vehicle steering systems, especially front-axle steering systems, also known as auxiliary power steering, of medium and heavy commercial vehicles, a recirculating ball steering gearbox can be operated by an external, unidirectional hydraulic pump. A connection between the pump and the steering gearbox can be made, for example, by means of external piping. In addition, an external oil reservoir may be required as an expansion tank. Thus, individual components of such a steering system can be distributed throughout the vehicle.

DE 20 2019 101 522 U1 discloses a corresponding steering assistance device for a vehicle, in particular for a commercial vehicle.

Against this background, the objective of the present approach is to create an improved control unit for a vehicle with a steering device, an improved steering device and an improved method for heating a working medium in a preheating phase for a steering device.

This objective is achieved by a control unit, by a steering device, and by a method, in accordance with the independent claims.

The advantages achievable with the presented approach are, for example, a better start-up behavior of the steering device in the event of a cold start of the vehicle.

A control unit for a vehicle containing a steering device is presented. The steering device has a pumping device with a pump for pumping a working medium to a first output port or a second output port of the pumping device, and an electric motor for driving the pump. Furthermore, the steering device has a transmission device with an input shaft that can be coupled to a steering wheel and an output shaft that can be coupled to a steering column lever, as well as a movable transmission element for transmitting a torque from the input shaft to the output shaft in a first direction and a second direction. The steering device further contains a first working medium port and a second working medium port, wherein the first working medium port for moving the transmission element in the first direction using the working medium is connected to the first output port, and the second working medium port for moving the transmission element in the second direction using the working medium is connected to the second output port. In addition, the steering device has a valve that is connected between the first output port and the second output port. Here the control unit is designed to provide a motor signal to the electric motor to operate the electric motor of the steering device in a preheating phase for heating the working medium, and to provide a valve opening signal to the valve to open the valve of the steering device.

The vehicle is implemented, for example, as a commercial vehicle, for example a truck or a bus. The steering device can advantageously be used to implement a steering requirement of a driver of the vehicle and additionally to provide support using the working medium. The transmission device is designed to transmit, for example, a steering movement of the driver via the steering wheel to the steering column lever and consequently to, for example, a wheel axle of the vehicle. For example, the pump can be implemented as a hydraulic pump that can pump the working medium, such as hydraulic oil, through the pumping device. The valve, which can also be used as a backup valve, for example, makes it possible to bypass the transmission device. When the valve is open, the working medium pumped by the pumping device can be passed past the transmission device through the valve. Thus the pumping device can be operated in the preheating phase and yet no steering assistance can be provided. In this way, the pumping device can be operated without causing a steering movement. The heat generated in the pumping device can be used to heat the working medium. Advantageously, this can improve the viscosity of the working medium, for example, before the vehicle is moving. The preheating phase can continue after the steering device has been put into operation until the working medium has reached a predetermined operating temperature. The preheating phase may be followed by a normal operation phase during which the steering device can be operated to assist the steering, or by a rest phase if no steering assistance is required, for example because the vehicle is not yet being moved. The control unit may be designed to provide an appropriate motor control signal depending on a current operating phase of the steering device.

According to one embodiment, the control unit may be designed to provide the motor signal to the electric motor to operate the electric motor in a normal operating phase for moving the steering column lever and to provide a valve closing signal to the valve to close the valve. The normal operating phase can describe, for example, the state when the vehicle is being driven and the steering assistance is being provided. Depending on the embodiment, the valve opening signal and the valve closing signal can be separate signals or different states of a signal.

According to one embodiment, the control unit may be designed to provide the motor signal in the preheating phase as a signal that causes a current flow through a motor winding of the electric motor from which no rotation of a rotor of the electric motor results. For example, the motor signal may have a characteristic that prevents the electric motor from starting. Due to the current flow, the motor winding is heated. Thus, the electric motor can be used as a heating device to heat the medium without driving the pump.

According to one embodiment, the control unit may be designed to provide the motor signal in the preheating phase as a signal that causes a current flow of a first magnitude through the motor winding, resulting in rotation of the rotor at a first rotation rate. Further, the control unit may be designed to provide the motor signal in the normal operation phase as a signal that causes the current flow of the first magnitude through the motor winding, resulting in the rotation of the rotor with a second rotation rate greater than the first rotation rate. Thus, in the preheating phase, the electric motor can be operated in such a way that the electric motor has a lower efficiency in relation to the torque provided by the electric motor than in the normal operating phase. Advantageously, a larger proportion of electrical energy is converted into thermal energy in the preheating phase than in the normal operating phase.

The control unit can be designed to activate the preheating phase in response to a temperature signal that indicates a temperature that is below a threshold value. The threshold value can be associated with a certain viscosity of the working medium. The threshold value can be below an optimal operating temperature or at an optimal operating temperature of the working medium. The temperature can be detected, for example, by means of a temperature sensor. Thus, the preheating phase can only be carried out if heating of the working medium is advantageous. For example, the preheating phase can be terminated when the temperature signal indicates a predetermined temperature of the working medium.

According to one embodiment, the control unit may be designed to activate the preheating phase in response to a start signal indicating a cold start of the vehicle. This means that the start signal is provided, for example, when the vehicle is started for the first time after a long standstill. In such a case, it can be assumed that the working medium is not yet at a desired operating temperature. For example, the preheating phase can also be terminated when the temperature signal indicates a predetermined temperature of the working medium.

Furthermore, a steering device for a vehicle is presented, wherein the steering device has a pumping device with a pump for pumping a working medium to a first output port or a second output port of the pumping device and an electric motor for driving the pump. Furthermore, the steering device has a transmission device with an input shaft that can be coupled to a steering wheel and an output shaft that can be coupled to a steering column lever, a transmission element movable for transmitting torque from the input shaft to the output shaft in a first direction and a second direction, and a first working medium port and a second working medium port. Here the first working medium port for moving the transmission element in the first direction using the working medium is connected to the first output port, and the second working medium port for moving the transmission element in the second direction using the working medium is connected to the second output port. The steering device also has a valve connected between the first output port and the second output port and a control unit in one of the variants presented.

The steering device can, for example, be implemented as a steering gearbox, as can be used in commercial vehicles, for example. Advantageously, steering movements of the driver are supported by this.

According to one embodiment, a motor winding of the electric motor may be surrounded by the working medium. Advantageously, this can enable good thermal coupling, since the working medium can be heated directly from the motor winding.

According to one embodiment, the pump and the electric motor may have a common shaft and may be placed in a common housing. This advantageously saves installation space within the vehicle, as only one housing is installed instead of two.

The housing may have a channel for directing the working medium from an inlet along an inner wall of the housing to the motor winding. The channel can be shaped to guide the working medium around the motor winding. Advantageously, the working medium is heated evenly in this way. For example, the channel can be shaped as a groove or recess in a housing element or as a tube. The inlet can denote, for example, an interface between the pump and the channel or, alternatively, an interface between a storage vessel and the pumping device. Advantageously, due to the arrangement of the channel, the motor winding can be cooled by means of a working medium.

According to one embodiment, a rotor of the electric motor may have a plurality of permanent magnets, wherein adjacent permanent magnets are spaced apart by slots for passing the working medium through.

According to one embodiment, the slots may be shaped to convey the working medium when the rotor rotates. Thus, the slots between the permanent magnets can cause the working medium to circulate.

According to one embodiment, the pump may be formed as a bidirectional hydraulic pump. Advantageously, in this way, a simple output of the working medium can be achieved depending on the desired conveying direction of the working medium.

Furthermore, a method for heating a working medium in a preheating phase for a steering device in one of the previously mentioned variants is presented. The method includes a step of providing a motor signal to an electric motor of the steering device to operate the electric motor and a step of providing a valve opening signal to a valve of the steering device for opening the valve.

The method can be carried out, for example, in a steering device by means of a control unit in one of the previously mentioned variants. Advantageously, the viscosity of the working medium can be reduced by the heat generated during the operation of the electric motor without exerting torque on the steering rod of the steering device. The open valve allows the working medium to be circulated in the lines of the steering device so that as much of the working medium as possible can be heated.

This method can be implemented, for example, in software or hardware or in a mixed form of software and hardware, for example in a control unit. The control unit can be designed to perform, control or implement the steps of a variant of a method presented here in appropriate devices. Also through this embodiment variant of the approach in the form of a device, the objective on which the approach is based can be achieved quickly and efficiently.

This control unit may have at least one computing unit for processing signals or data, at least one memory unit for storing signals or data, at least one interface to a sensor or an actuator for reading sensor signals from the sensor or for outputting data or control signals to the actuator and/or at least one communication interface for reading or outputting data that are embedded in a communication protocol. The computing unit may be, for example, a signal processor, a microcontroller, or the like, wherein the memory unit may be a flash memory, an EPROM, or a magnetic memory unit. The communication interface may be designed to read or output data wirelessly and/or by wire, wherein a communication interface that can read or output wired data can, for example, read this data electrically or optically from a corresponding data transmission line or output it into a corresponding data transmission line.

In this case, a control unit can be understood to be an electrical device that processes sensor signals and, depending on them, outputs control and/or data signals. The control unit may have an interface that can be of a hardware and/or software form. In the case of a hardware design, the interfaces can, for example, be part of a so-called system ASIC, which contains a wide variety of functions of the control unit. However, it is also possible that the interfaces are dedicated integrated circuits or at least partially consist of discrete components. In the case of a software design, the interfaces can be software modules that are present, for example, on a microcontroller alongside other software modules.

Examples of the approach presented here are explained in more detail in the following description with reference to the figures.

In the following description of favorable exemplary embodiments of the present approach, the same or similar reference signs are used for elements depicted in the various figures that have a similar effect, wherein a repeated description of these elements is omitted.

DETAILED DESCRIPTION OF THE DRAWINGS

Figure 1:
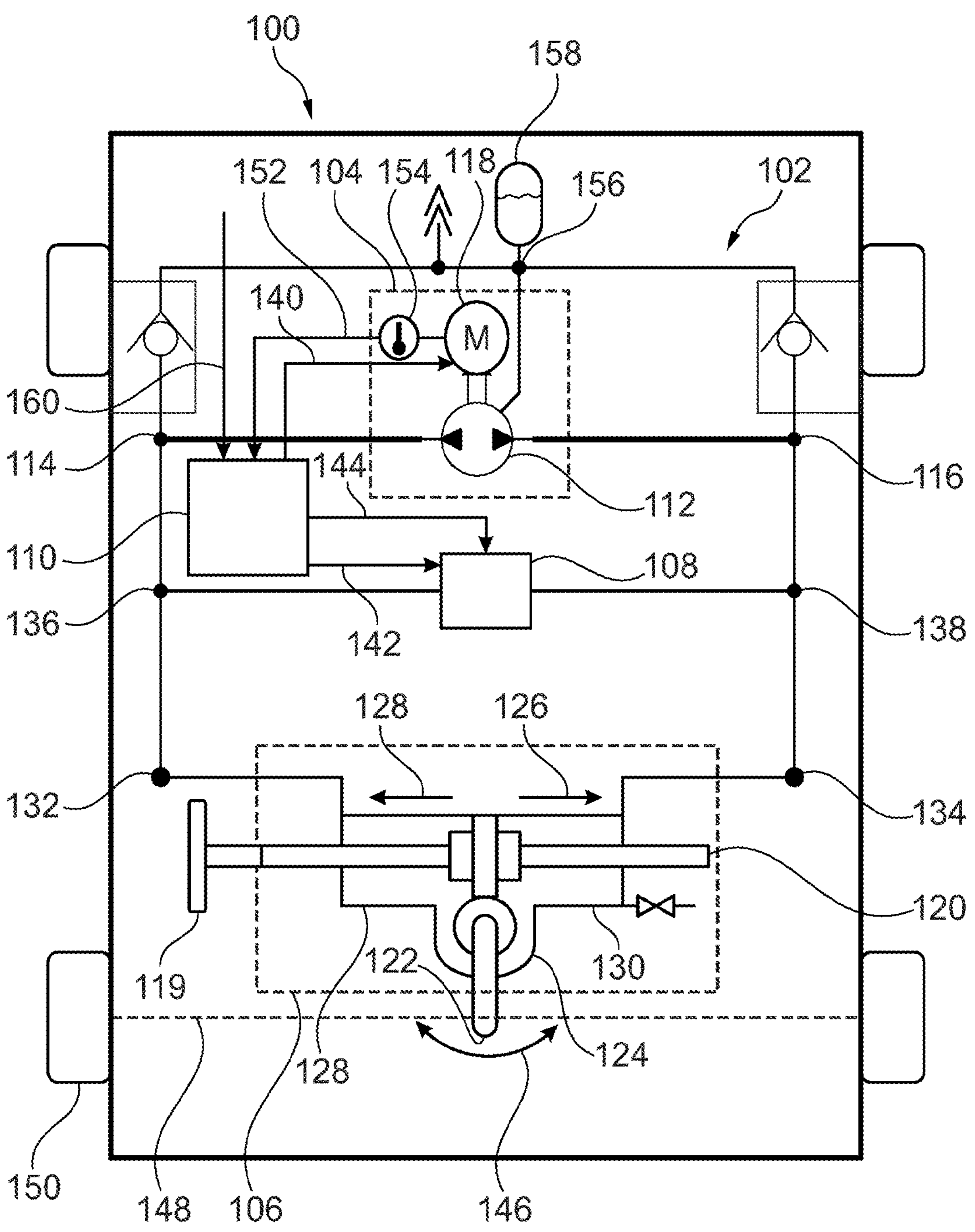
FIG. 1 is a schematic representation of a vehicle with a steering device according to an exemplary embodiment.

FIG. 1 shows a schematic representation of a vehicle 100 with a steering device 102 according to an exemplary embodiment. The vehicle 100, for example, is implemented as a commercial vehicle. The steering device 102 is designed to assist in a steering operation by a driver of the vehicle 100. For this purpose, the steering device 102 has a pumping device 104, a transmission device 106, a valve 108 and a control unit 110.

The pumping device 104 contains a pump 112 for pumping a working medium either to a first output port 114 or to a second output port 116 of the pumping device 104. Further, the pumping device 104 includes an electric motor 118 designed to drive the pump 112. For this purpose, the electric motor 118 and the pump 112 are coupled to each other via a shaft. The pump 112, for example, is implemented as a bidirectional hydraulic pump.

The transmission device 106 has an input shaft 120 that can be coupled to a steering wheel 119 and an output shaft 124 that can be coupled to a steering column lever 122. Further, the transmission device 106 has a moving transmission element 130 for transmitting a torque from the input shaft 120 to the output shaft 124 in a first direction 126 and a second direction 128. Further, the transmission device 106 comprises a first working medium port 132 and a second working medium port 134, wherein the first working medium port 132 is connected to the first output port 114 for moving the transmission element 130 in the first direction 126 using the working medium and the second working medium port 134 is connected to the second output port 116 for moving the transmission element 130 in the second direction 128 using the working medium. For moving the transmission element 130 using the working medium, at least one cylinder is provided, according to one exemplary embodiment, which is formed to use a pressure of the working medium to move the transmission element 130.

According to this exemplary embodiment, the input shaft 120 is connected or mechanically coupled to the steering wheel 119 of the vehicle 100 via the steering column of the steering system. According to one exemplary embodiment, the input shaft 120 is designed to introduce torque from a steering column of vehicle 100 coupled to the steering wheel 119 into the steering device 102. The torque introduced via the input shaft 120 can also be referred to as an input torque. The output shaft 124 is designed according to this exemplary embodiment to transmit the torque out of the steering device 102 or to output the torque to the steering column lever 122. The torque discharged via the output shaft 124 may also be referred to as an output torque or an output force. The transmission element 130 is designed according to this exemplary embodiment to mechanically transfer the torque from the input shaft 120 to the output shaft 124 and/or to convert the input torque into the output torque. In order to support a steering movement exerted by the driver of the vehicle 100, a movement of the transmission element 130 is supported using the working medium. Accordingly, in the case of an automated steering vehicle 100, the transmission element 130 can be moved exclusively using the pressure of the working medium.

The valve 108 of the steering device 102 is connected between the first output port 114 and the second output port 116. According to this exemplary embodiment, a first valve port 136 of the valve 108 is fluidically connected to the first output port 114 and the first working medium port 132. Similarly, according to this exemplary embodiment, the second valve port 138 of the valve 108 is fluidically connected to the second output port 116 and the second working medium port 134.

The steering device 102 also has the control unit 110, which is designed to determine a current operating phase of the steering device 102 and, depending on the current operating phase, to provide a suitable motor signal 140 for operating the electric motor 118 and a suitable valve signal 142, 144 for controlling the valve 108. According to an exemplary embodiment, the control unit 110 is designed to start a preheating phase when heating the working medium is advantageous, for example, to reduce the viscosity of the working medium. The control unit 110 may be designed to maintain the preheating phase until the working medium is heated to a predetermined temperature. Following the preheating phase, the control unit 110 is designed according to an exemplary embodiment to begin a normal operating phase in which steering assistance is provided by the steering device 102, for example, for normal driving of the vehicle 100. Here the steering assistance can be provided in response to a request signal that indicates a steering and steering direction 146 of the vehicle 100 requested, for example, by a driver of the vehicle 100. Depending on the required steering direction 146, the control unit 110 is designed according to an exemplary embodiment to provide the motor signal 140 with a characteristic that causes a rotation of the electric motor 112 assigned to the steering direction 146.

According to an exemplary embodiment, the control unit 110 is designed to provide the motor signal 140 and the valve signal 142, 144 in the preheating phase in such a way that the electric motor 118 is operated, i.e. energized, but no steering assistance is provided, for example, because there is no pressure at the working medium ports 132, 134 or only a pressure insufficient to move the transmission element 130. For this purpose, the motor signal 140 is provided, for example, with a characteristic that results in a current flow through at least one winding of the electric motor 118, which generates a magnetic field not suitable for moving the rotor of the electric motor 118. Alternatively, the motor signal 140 is provided, for example, with a characteristic that results in a current flow through at least one winding of the electric motor 118 that generates a magnetic field suitable for moving the rotor of the electric motor 118. In this case, the control unit 110 is designed to provide the valve signal in the form of a valve opening signal 142 for opening the valve 108. The characteristics of the motor signal 140 may relate, for example, to an amplitude and/or modulation of the motor signal 140.

According to one exemplary embodiment, the control unit 110 is designed to provide the motor signal 140 in the normal operation phase with a characteristic that ensures the operation of the electric motor 112 suitable for driving the pump 118. Further, the control module 110 is designed to provide the valve signal to the valve 108 in the form of a valve closing signal 144 for closing the valve 108. In this way, sufficient pressure of the working medium is generated to support the steering movement, and this pressure is applied to one of the working medium ports 132, 134, depending on the direction of delivery of the pumping device 104.

An electrical energy provided by the motor signal 140 to the electric motor 118 is partly converted into heat and partly used to drive the rotor of the electric motor 118. According to one exemplary embodiment, the control unit 110 is designed to provide the motor signal 140 in such a way that the portion of the electrical energy supplied to the electric motor 118 converted into heat is greater in relation to the portion used for propulsion in the preheating phase than in the normal operation phase. According to one exemplary embodiment, the control unit 110 is designed to provide the motor signal 140 in the preheating phase with a characteristic that causes a current flow of a first magnitude through the motor winding, which generates a first magnetic field resulting in a rotation of the rotor with a first rotation rate. In the normal operation phase, on the other hand, the control unit 110 is designed to provide the motor signal 140 with a characteristic that causes a current flow of the first magnitude through the motor winding, which generates a second magnetic field resulting in a rotation of the rotor with a second rotation rate greater than the first rotation rate. Thus, can The control unit 110 is designed according to an exemplary embodiment to activate the preheating phase in response to a temperature signal 152 which indicates a temperature of the working medium that is below a threshold value. The temperature signal 152 is provided by a temperature sensor 154 according to this exemplary embodiment. According to this exemplary embodiment, the temperature sensor 154 is implemented as part of the pumping device 104. Alternatively, the temperature sensor 154 can also be arranged elsewhere in the vehicle 100. For example, the control unit 110 is designed to terminate the preheating phase as soon as the temperature signal 152 indicates a temperature of the working medium that is at or above the threshold value. Alternatively or additionally, the control unit 110 is designed, for example, to end the preheating phase after a predetermined period of time.

According to this exemplary embodiment, the control unit 110 is additionally or alternatively designed to activate the preheating phase in response to a start signal 160, which indicates a cold start of the vehicle 100. For example, the start signal 160 is provided by an engine control system of the vehicle 100.

According to the exemplary embodiment shown, the pumping device 104 has an optional input port 156 through which the pumping device 104 according to this exemplary embodiment is connected to a storage vessel 158 for storing the working medium.

In other words, a possibility is presented for preheating the working medium, which can also be implemented as hydraulic oil and can be referred to as oil, during a cold start of the vehicle 100. This means that for an application for steering the vehicle 100, for example a truck, an electro-hydraulic steering gearbox, for example, which is referred to here as a transmission device 106, is controlled via a bidirectional pumping device 104 with, for example, a hydraulic pump in the form of the pump 112. The two ports of the pumping device 104, which are referred to herein as the first output port 114 and the second output port 116, are connected to the transmission device 106, for example to at least one cylinder of a known classic steering gearbox. According to an exemplary embodiment, the electric motor 118 driving the pump 112 is surrounded by the working medium of the storage vessel 158, which is also referred to as the storage tank or expansion vessel. Even before the start of a journey, the viscosity of the working medium can be improved by suitable control of the electric motor 118 by increasing the temperature of the working medium.

According to one exemplary embodiment, the electric motor 118 rotates by opening the valve 118 without moving the steering column lever 122. As a result, the heated working medium is distributed in the pumping device 104. The motor windings of the electric motor 118 can optionally be controlled in such a way that the motor windings heat up strongly even at a standstill or when the motor power is low.

Figure 2:
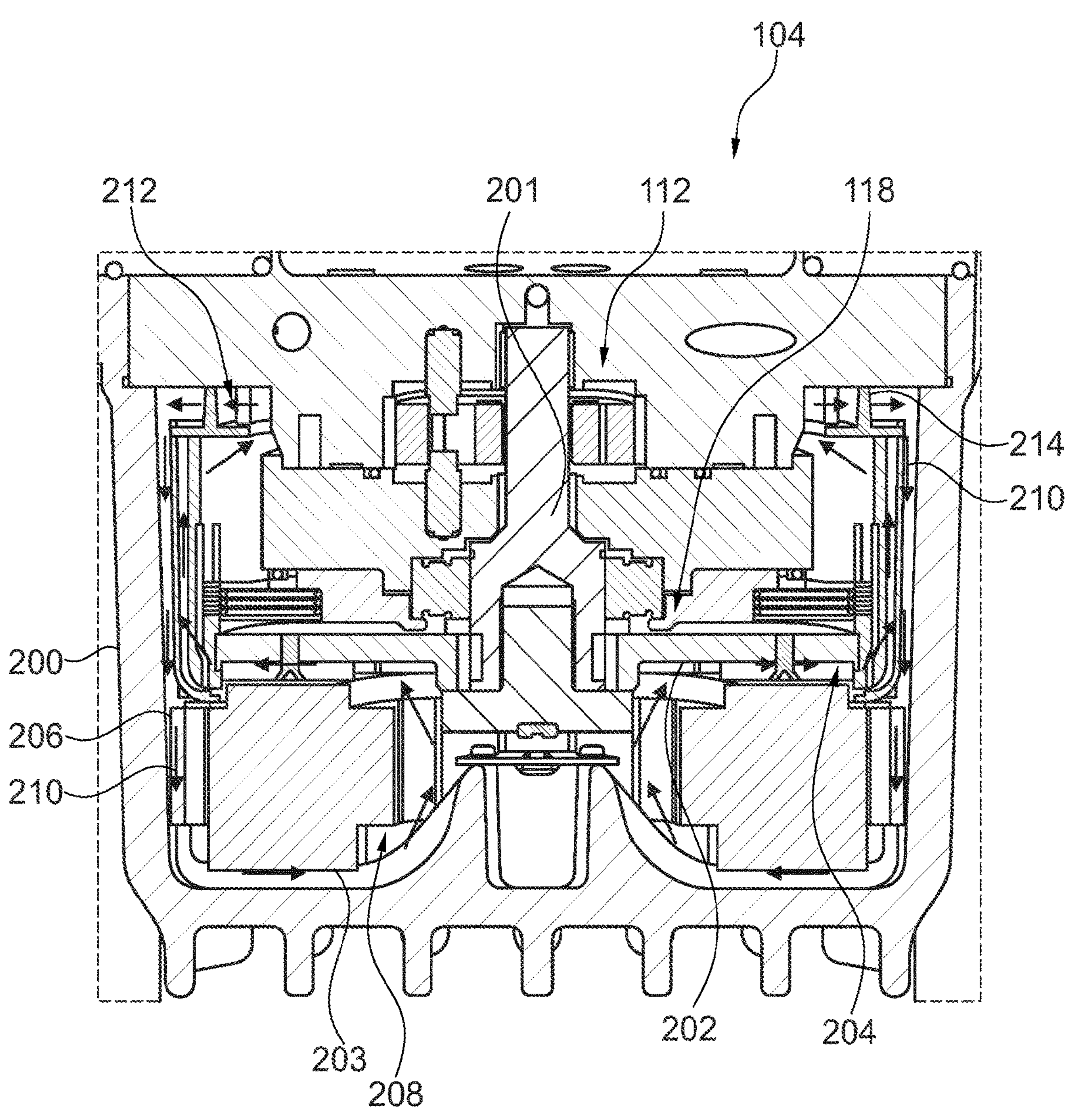
FIG. 2 is a schematic cross-sectional representation of a pumping device according to an exemplary embodiment.

FIG. 2 shows a schematic cross-sectional representation of a pumping device 104 according to an exemplary embodiment. The pumping device 104 shown here can be similar to or correspond to the pumping device 104 described in FIG. 1. According to this exemplary embodiment, the pump 112 and the electric motor 118 are arranged adjacent to each other in a common housing 200. The housing 200 encloses the pump 112, the electric motor 118 and a common shaft 201 coupling the pump 112 to the electric motor 118. The working medium delivered by the pump 112 is fed through the housing 200 in such a way that it is heated by the electric motor 118.

The electric motor 118 contains a rotor 202 and a stator 203. The rotor 202 has a plurality of permanent magnets, wherein adjacent permanent magnets are spaced apart by slots 204 for passing the working medium through. The slots 204 are formed to convey the working medium when the rotor 202 rotates.

According to this exemplary embodiment, the housing 200 has a channel 206 for directing the working medium from an inlet along an inner wall of the housing 200 to the motor windings 208 of the electric motor 118 located on the stator 203. The channel 206 is shaped to guide the working medium around the motor winding 208. A flow direction of the working medium is illustrated by the arrows 210 shown. According to this exemplary embodiment, this also illustrates that the motor windings 208 are surrounded by the working medium, for example to enable good thermal coupling.

In summary, the pump 112 pumps the working medium starting from a pump outlet 212 through the channel 206 along a wall of the housing 200, where the working medium cools according to an exemplary embodiment, towards the motor windings 208. From there, according to this exemplary embodiment, the working medium flows around the motor winding 208 and through the slots 204, which act as a circulation pump, towards the housing wall to the pump outlet 212 through a heat exchanger 214, for example. In other words, the electric motor 118 is used as a heating device for preheating the working medium in the event of, for example, a cold outside temperature. The embedding of the motor windings 108 in the working medium allows good thermal coupling between the electric motor 118 and the surrounding working medium. The slots 204 between the plurality of permanent magnets on the rotor 202, which is also referred to as the rotor disk, serve as a drive for circulating the working medium. The working medium circulating in the direction of the arrows 210 flows through the coils of the electric motor 118 forming the motor windings 108 and heats up in the process.

Figure 3:
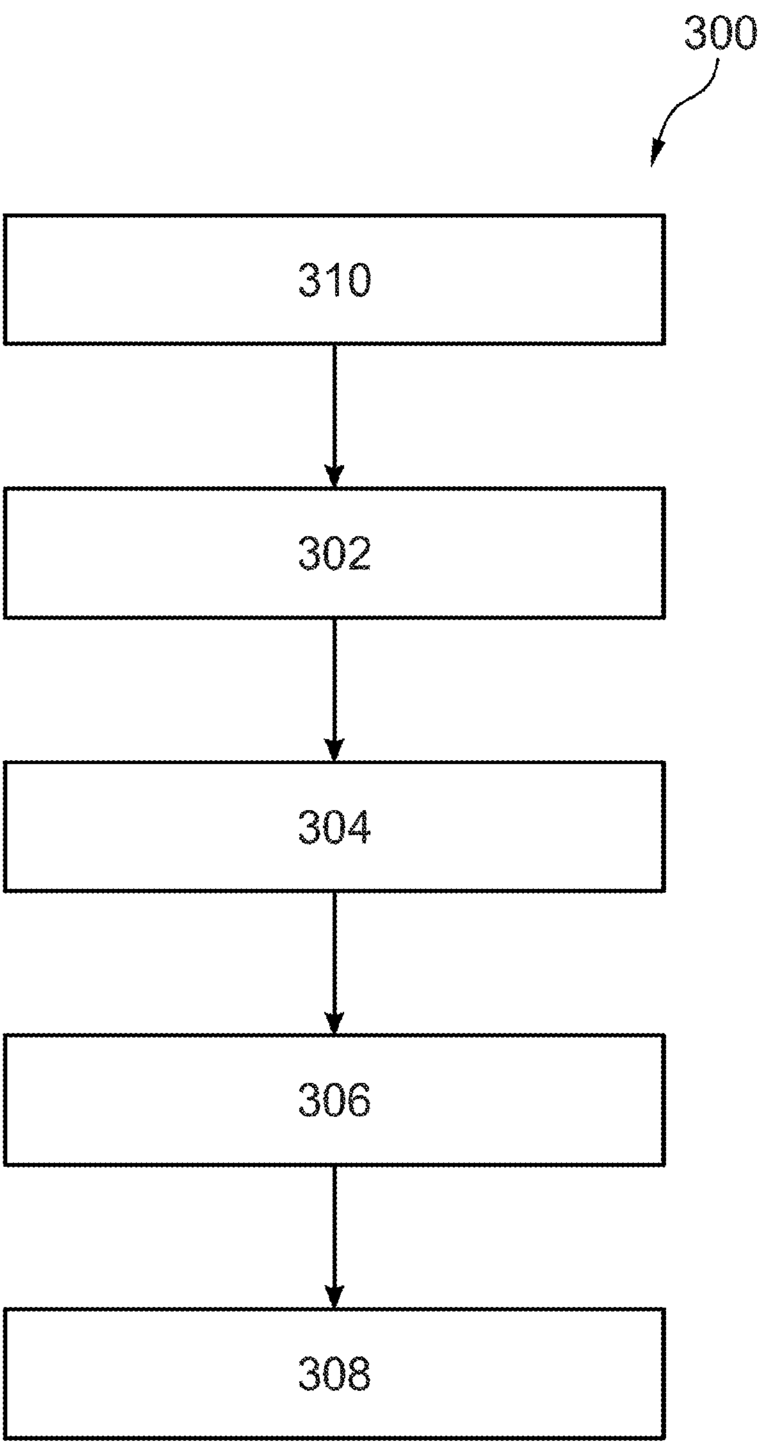
FIG. 3 is a flow diagram of a method for heating a working medium in a preheating phase for a steering device according to an exemplary embodiment.

FIG. 3 shows a flow diagram of a method 300 for heating a working medium in a preheating phase for a steering device according to an exemplary embodiment. The method 300 can be carried out in a control unit as was described in FIG. 1. The method 300 includes a step 302 of providing a motor signal to an electric motor of the steering device to operate the electric motor and a step 304 of providing a valve opening signal to a valve of the steering device to open the valve. Steps 302, 304, which are carried out to heat the working medium. are carried out in a preheating phase. During the preheating phase, the valve remains open continuously according to an exemplary embodiment. According to an exemplary embodiment, the electric motor is operated in the preheating phase exclusively to heat the working medium, steering assistance is not provided in the preheating phase.

Optionally, the method 300 includes a step 306 of providing the motor signal with the same or a modified characteristic as related to step 302, and a step 308 of providing a valve closing signal to close the valve. Steps 306, 308 are performed in a normal operating phase in which the working medium is pressurized to steer the vehicle or to assist in steering.

According to one exemplary embodiment, the method 300 includes a step 310 of reading a temperature signal indicating a temperature of the working medium. According to one exemplary embodiment, the step 310 is executed continuously and repeatedly to continuously monitor the temperature of the working medium. According to an exemplary embodiment, the preheating phase continues as long as the temperature signal indicates a temperature of the working medium that is below a predetermined operating temperature. For example, after the vehicle has been put into operation, it is checked whether the temperature of the working medium is already at the operating temperature. If this is the case, the preheating phase is skipped and the normal operating phase is initiated directly. On the other hand, if the temperature of the working medium is below the operating temperature, the preheating phase is carried out before the start of the normal operating phase in order to increase the temperature of the working medium to the operating temperature.

REFERENCE LIST

100 Vehicle
102 Steering device
104 Pumping device
106 Transmission device
108 Valve
110 Control unit
112 Pump
114 First output port
116 Second output port
118 Electric motor
119 Steering wheel
120 Input shaft
122 Steering column lever
124 Output shaft
126 First direction
128 Second direction
130 Transmission element
132 First working medium port
134 Second working medium port
136 First valve port
138 Second valve port
140 Motor signal
142 Valve opening signal
144 Valve closing signal
146 Steering direction
148 Steering rod
150 Vehicle wheels
152 Temperature signal
154 Temperature sensor
156 Input port
158 Storage vessel
160 Start signal
200 Housing
201 Shaft
202 Rotor
203 Stator
204 Slit
206 Channel
208 Motor winding
210 Arrow
212 Pump outlet
214 Heat exchanger
300 Method
302 Step of providing a motor signal
304 Step of providing a valve opening signal
306 Step of providing a motor signal
308 Step of providing a valve closing signal
310 Reading step

The invention claimed is:

1. A steering device for a vehicle, comprising:

a pump device with a pump for pumping a working medium to a first output port or a second output port of the pump device and an electric motor for driving the pump;

a transmission with an input shaft that is couplable to a steering wheel and an output shaft that is couplable to a steering column lever, a transmission element movable for transmitting a torque from the input shaft to the output shaft in a first direction and a second direction, and a first working medium port and a second working medium port, wherein the first working medium port for moving the transmission element in the first direction using the working medium is connected to the first output port and the second working medium port for moving the transmission element in the second direction using the working medium is connected to the second output port;

a valve connected between the first output port and the second output port; and a control unit configured to:

provide a motor signal to the electric motor of the steering device to operate the electric motor in a preheating phase for heating the working medium, and provide a valve opening signal to the valve for opening the valve of the steering device;

wherein the pump and the electric motor have a common shaft and are arranged in a common housing;

wherein the housing has a channel for conducting the working medium from an inlet along an inner wall of the housing to a motor winding of the electric motor, which is located on a stator of the electric motor, and the channel is shaped to conduct the working medium around the motor winding; and wherein a rotor of the electric motor has a plurality of permanent magnets, wherein adjacent ones of the plurality of permanent magnets are spaced apart by slots for passing the working medium through.

2. The steering device as claimed in claim 1, wherein the motor winding of the electric motor is surrounded by the working medium.

3. The steering device as claimed in claim 1, wherein the slots are shaped to convey the working medium when the rotor rotates.

4. The steering device as claimed in claim 1, wherein the pump is a bidirectional hydraulic pump.

* * * * *